United States Patent [19]

Bernstein et al.

[11] 4,359,571

[45] Nov. 16, 1982

[54] PROCESS FOR PREPARING GRAFT POLYMER DISPERSIONS AND POLYURETHANES PREPARED THEREFROM

[75] Inventors: William A. Bernstein, Dearborn Heights; John E. Davis, Woodhaven; Joseph R. Gregoria, Jr., Southgate, all of Mich.

[73] Assignee: BASF Wyandotte Corporation, Wyandotte, Mich.

[21] Appl. No.: 298,454

[22] Filed: Sep. 2, 1981

[51] Int. Cl.³ .............................................. C08G 67/02
[52] U.S. Cl. .................................................... 528/392
[58] Field of Search ......................................... 528/392

[56] References Cited

U.S. PATENT DOCUMENTS

| | | | |
|---|---|---|---|
| 3,627,839 | 12/1971 | Vandenberg | 528/392 |
| 3,931,092 | 1/1976 | Ramlow et al. | 528/392 |
| 4,028,434 | 6/1977 | Kanter et al. | 528/392 |

OTHER PUBLICATIONS

Lange's Handbook of Chemistry, pp. 7-64 and 7-349.

*Primary Examiner*—Joseph L. Schofer
*Assistant Examiner*—N. Sarofin
*Attorney, Agent, or Firm*—Norbert M. Lisicki

[57] ABSTRACT

The present invention relates to a process for the preparation of stable graft polymer dispersions having improved dispersibility by a free radical polymerization of an ethylenically unsaturated monomer under conditions of no-reflux or alternatively under conditions that do not return the evaporated monomer to the dispersion. Polyurethane foams may be prepared from these polymer dispersions.

7 Claims, 1 Drawing Figure

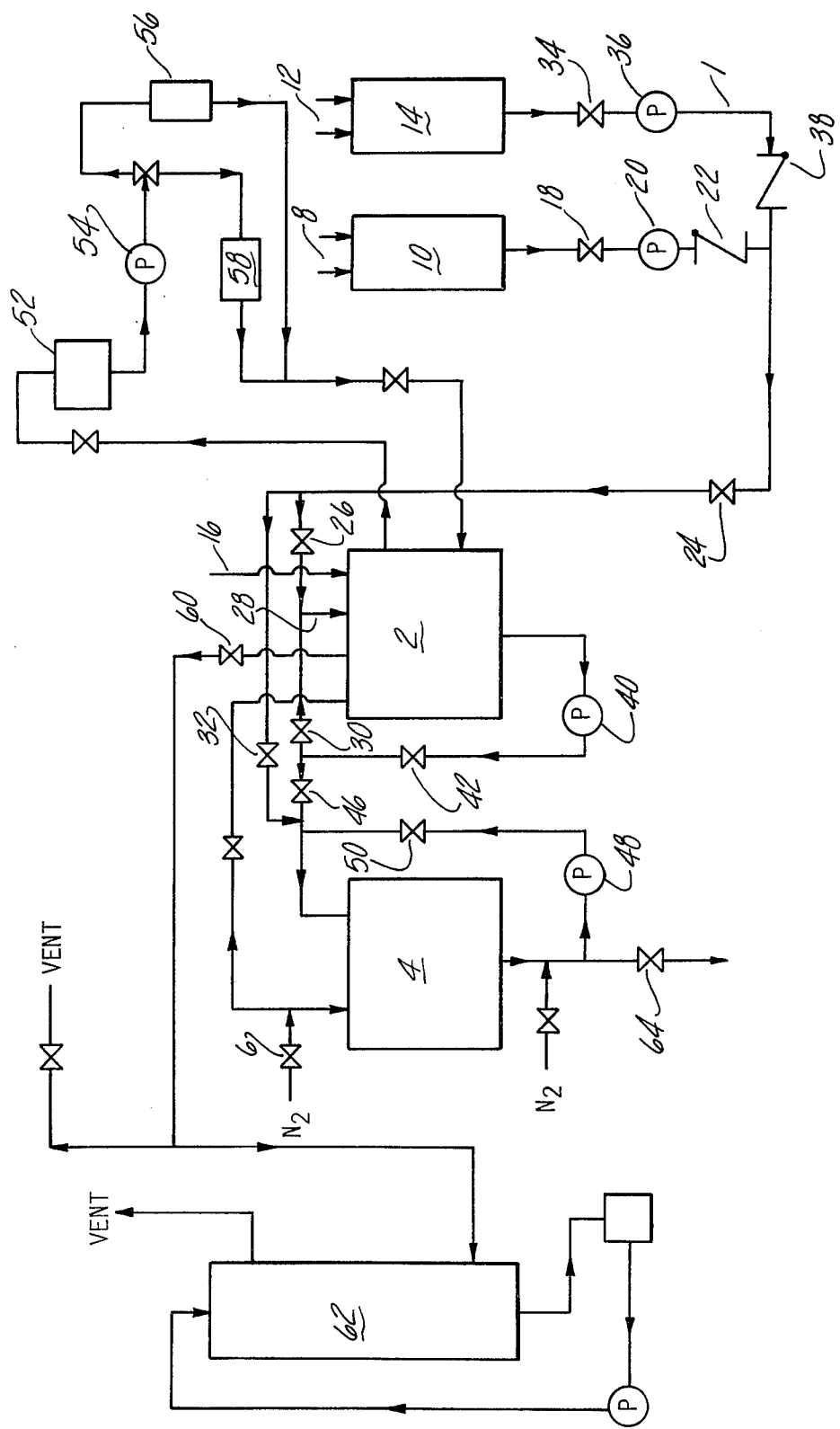

PROCESS FOR PREPARING GRAFT POLYMER DISPERSIONS AND POLYURETHANES PREPARED THEREFROM

BACKGROUND OF THE INVENTION

1. Field of the Invention

The present invention relates to stable graft polymer dispersions of low viscosity and improved dispersibility and polyurethanes prepared therefrom. More particularly, the invention relates to graft polymer dispersions prepared by the improved process employing in situ free radical polymerization of an ethylenically unsaturated monomer or monomers in polyol under such conditions that none of the evaporated monomer is returned to the dispersion, or alternatively, the polymerization proceeds without any reflux of the monomer.

2. Description of the Prior Art

The prior art, as evidenced by U.S. Pat. Nos. 3,652,658; 3,875,258; 3,950,317, and U.S. Pat. Nos. Re. 28,715 and Re. 29,014 teach the preparation of graft polymer dispersions which are useful in the preparation of polyurethanes by the polymerization of ethylenically unsaturated monomers in the presence of polyols. The above patents disclose various methods of preparing graft polyol dispersions. U.S. Pat. No. 3,931,092 teaches the preparation of polymeric solids by polymerizing in the presence of a free-radical initiator and an organic solvent. The solvent concentration employed is from about 1 part to 19 parts by weight per part of the hydroxy-terminated organic compound which has a polymerizable carbon double bond. U.S. Pat. No. 3,953,393 teaches the preparation of graft copolymer dispersions by employing alkylmercaptan chain transferring agents at concentrations from 0.1 to 2 percent by weight based on the weight of vinyl monomer. None of the prior art reveals an awareness of the desirability of conducting the polymerization either without reflux of the monomer or without returning any evaporated monomer to the reaction mixture.

SUMMARY OF THE INVENTION

It has been discovered that low viscosity graft polymer dispersions in polyol having improved dispersibility may be prepared using the process of the instant invention. The present invention relates to an improved process for the preparation of low-viscosity stable polymer dispersions having improved dispersibility. These dispersions are prepared by a process wherein the monomers are prevented from refluxing or wherein any evaporated monomer is not returned to the reaction mixture.

BRIEF DESCRIPTION OF THE DRAWING

The drawing illustrates a flow diagram of the graft polymer dispersion process.

DESCRIPTION OF THE PREFERRED EMBODIMENTS

In accordance with the improved process for the preparation of stable graft polymer dispersions of low viscosity and improved dispersibility prepared by the in situ polymerization of an ethylenically unsaturated monomer or mixtures of said monomers in a polyol, in the presence of a free-radical initiator, the improvement comprises conducting the polymerization wherein any vaporized monomer is not returned to the reaction mixture. In the alternative, the process is conducted under pressure of an inert gas in order to prevent any vaporization or reflux of the monomer. The polymerization may be carried out at temperatures between 25° C. and 180° C., preferably between 80° C. and 135° C. The improved process for the preparation can be described by reference to the attached drawing. In the drawing, reactor 2 and reactor 4 are purged with nitrogen 6 with the excess being vented with approximately a 1 psig of nitrogen pad remaining in the reactors. Polyol and initiator feed tank 10 is charged employing inlet 8 while monomer tank 14 is charged employing inlet 12. Reactor 2 is partially charged with some preformed graft polymer dispersion in polyol through inlet 16. Polyol and initiator are then fed through valve 18 employing pump 20 valve gate 22 and valve 24 through valve 26 at inlet 28. Simultaneously, monomer is fed through valve 34, pump 36, valve gate 38 through valves 24 and 26 at inlet 28. Upon reaching a predetermined volume of graft polyol dispersion in reactor 2, valves 42 and 46 are opened and employing pump 40, crude graft polymer dispersion is pumped into reactor 4. The flow of graft polymer dispersion into reactor 4 is adjusted to be equivalent to the amount of raw material being pumped into reactor 2. The material present in reactor 4 is then recycled employing pump 48 through valve 50. The temperature of reactor 2 is controlled by circulating a glycol 52 employing pump 54 through either heater 56 or cooling tank 58. During the process, excess nitrogen pressure which results from the decomposition of the initiator is vented through valve 60 and condenser 62 while maintaining a constant nitrogen pad on both reactors. The finished product upon being completed is discharged from reactor 4 through valve 64. The process may be operated in a continuous manner or as a batch process.

The particle size range of the graft polymer dispersion or dispersibility is preferably submicron in size. A filtration test for evaluating the parameters of preparing such graft polymer dispersions has been developed. A polypropylene filter paper, 76 mm size, 10 micron pore size is dried to constant weight. A dispersion of the graft polymer dispersion is made by weighing accurately about 5 grams of the graft polymer dispersion into a 400 ml beaker and diluting with about 200 ml of reagent grade isopropanol. The dispersion is mixed well with a magnetic stirrer for 20 minutes and then quantitatively transferred to a Buchner funnel containing the tared filter. The dispersion is vacuum filtered (aspirator) and the residue rinsed with 75–100 ml of isopropanol. The filter containing the residue is carefully dried in a vacuum oven at 75° C. and less than 10 mm Hg pressure for 20 minutes. It is then weighed and the gain in weight of the filter reported as a percentage of the original weight of the graft polymer dispersion. It is preferably reported as percent polymer retained X $10^3$.

The polyols which may be employed in the present invention are well known in the art. Both conventional polyols essentially free of ethylenic unsaturation such as those described in U.S. Pat. No. Re. 28,715 and unsaturated polyols such as those described in U.S. Pat. Nos. 3,652,659 and Re. 29,014 may be employed in the invention. Representative polyols essentially free from ethylenic unsaturation which may be employed in the present invention are well known to those skilled in the art. They are often prepared by the catalytic condensation of an alkylene oxide or mixture of alkylene oxides either simultaneously or sequentially with an organic compound having at least two active hydrogen atoms, such as evidenced by U.S. Pat. Nos. 1,922,459; 3,190,927; and 3,346,557. Representative polyols include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain 2 or more different groups within the above-defined classes may also be used, for example, amino alcohols which contain an amino group and a hydroxyl group. Also, alkylene oxide adducts of compounds which contain one SH group and one OH group as well as those which contain an amino group and an SH group may be used. Generally, equivalent weights of the polyols will vary from 100 to 10,000, preferably from 1000 to 3000.

Any suitable hydroxy-terminated polyester may be used such are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example, the process disclosed by Wurtz in 1859 and Encyclopedia of Chemical Technology, Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2'-(4,4'-hydroxyphenyl)propane and blends thereof having equivalent weights of from 100 to 5000.

Suitable polyhydric polythioethers which may be condensed with alkylene oxides include the condensation product of thiodiglycol or the reaction product of a dicarboxylic acid such as is disclosed above for the preparation of the hydroxy-containing polyesters with any other suitable thioether glycol.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two -SH groups such as 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,3-, 2,6-, 3,4-, 2,5-, 2,4-diaminotoluene; aliphatic amines such as methylamine, triisopropanolamine, ethylenediamine, 1,3-diaminopropane, 1,3-diaminobutane, and 1,4-diaminobutane.

Also, polyols containing ester groups can be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

The unsaturated polyols which may be employed in the present invention may be prepared by the reaction of any conventional polyol such as those described above with an organic compound having both ethylenic unsaturation and a hydroxyl, carboxyl, anhydride, isocyanate or epoxy group or they may be prepared by employing an organic compound having both ethylenic unsaturation and a hydroxyl, carboxyl, anhydride, or epoxy group as a reactant in the preparation of the conventional polyol. Representative of such organic compounds include unsaturated mono- and polycarboxylic acids and anhydrides such as maleic acid and anhydride, fumaric acid, crotonic acid and anhydride, propenyl succinic anhydride, and halogenated maleic acids and anhydrides, unsaturated polyhydric alcohols such as 2-butene-1,4-diol, glycerol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinylcyclohexene-3,4-epoxide, butadiene monoxide, vinyl glycidyl ether (1-vinyloxy-2,3-epoxy propane), glycidyl methacrylate and 3-allyloxypropylene oxide (allyl glycidyl ether). If a polycarboxylic acid or anhydride is employed to incorporate unsaturation into the polyols, it is preferable to react the unsaturated polyol with an alkylene oxide, preferably ethylene or propylene oxide, to replace the carboxyl groups with hydroxyl groups prior to employment in the present invention. The amount of alkylene oxide employed is such as to reduce the acid number of the unsaturated polyol to about one or less.

To prepare the unsaturated polyols for use in the present invention, from about 0.05 mole to about 3.0 moles, preferably from 0.30 mole to 1.50 moles, of said ethylenically unsaturated organic compound per mole of polyol is employed. The preparation of the unsaturated polyols employed in the present invention follows conventional prior art procedures such as are disclosed in U.S. Pat. No. 3,275,606 and U.S. Pat. No. 3,280,077. Generally, this requires a reaction at a temperature between 0° C. and 130° C. Both acidic catalysts, such as Lewis acid catalysts and basic catalysts such as alkali metal hydroxides, may be used. In addition, a noncatalyzed reaction may be used employing temperatures between 50° C. and 200° C.

As mentioned above, the graft copolymer dispersions of the invention are prepared by the in situ polymerization, in the above-described polyols of an ethylenically unsaturated monomer or a mixture of ethylenically unsaturated monomers. Representative ethylenically unsaturated monomers which may be employed in the present invention include butadiene, isoprene, 1,4-pentadiene, 1,6-hexadiene, 1,7-octadiene, styrene, α-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxystyrene, methyl 4-vinylbenzoate, phenoxystyrene, p-vinyl diphenyl sulfide, p-vinylphenyl oxide, and the like; the acrylic and substituted acrylic monomers such as acrylonitrile, acrylic acid, methacrylic acid, methyl acrylate, 2-hydroxyethyl acrylate, 2-hydroxyethyl methacrylate, methyl methacrylate, cyclohexyl methacrylate, benzyl methacrylate, α,α'-isopropyl methacrylate, octyl methacrylate, methacrylonitrile, methyl α-chloroacrylate, ethyl α-ethoxyacrylate, methyl α-acetaminoacrylate, butyl acrylate, 2-ethylhexyl acrylate, phenyl acrylate, phenyl methacrylate, α-chloroacrylonitrile, N,N-dimethylacrylamide, N,N-dibenzylacrylamide, N-butylacrylamide, methacrylyl formamide, and the like; the vinyl esters, vinyl ethers, vinyl ketones, etc., such as vinyl acetate, vinyl chloroacetate, vinyl butyrate, isopropenyl acetate, vinyl formate, vinyl acrylate, vinyl methacrylate, vinyl methoxyacetate, vinyl benzoate, vinyl iodide, vinyltoluene, vinylnaphthalene, vinyl bromide, vinyl fluoride, vinylidene bromide, 1-chloro-1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phosphonates such as bis(β-chloroethyl) vinylphosphonate, vinyl phenyl ketone, vinyl ethyl sulfide, vinyl ethyl sulfone, N-methyl-N-vinyl acetamide, N-vinyl-pyrrolidone, vinyl imidazole, divinyl sulfide, divinyl sulfoxide, divinyl sulfone, sodium vinylsulfonate, methyl vinylsulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention. Preferably, the monomer is selected from the group consisting of acrylonitrile, styrene and mixtures thereof.

The amount of ethylenically unsaturated monomer employed in the polymerization reaction is generally from one percent to 60 percent, preferably from 15 percent to 40 percent, based on the total weight of the product.

Illustrative polymerization initiators, generally called catalysts, although not true in the classical meaning of the term "catalyst," which may be employed are the well-known free radical types of vinyl polymerization initiators such as the peroxides, persulfates, perborates, percarbonates, azo compounds, etc. These include hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-α-cumyl peroxide, dipropyl peroxide, diisopropyl peroxide, isopropyl-t-butyl peroxide, butyl-t-butyl peroxide, difuroyl peroxide, bis(triphenylmethyl) peroxide, bis(p-methoxybenzoyl) peroxide, p-monomethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, transdecalin hydroperoxide, α-methylbenzyl hydroperoxide, α-methyl-α-ethyl benzyl hydroperoxide, tetralin hydroperoxide, triphenylmethyl hydroperoxide, diphenylmethyl hydroperoxide, α,α'-azobis(2-methyl butyronitrile), α,α'-azobis-(2-methyl heptonitrile), 1,1'-azo-bis(cyclohexane carbonitrile), α,α'-azobis(isobutyrate), 4,4'-azobis(4-cyanopentanoic acid), 2,2'-azobis(isobutyronitrile), 1-t-amylazo-1-cyanocyclohexane, persuccinic acid, diisopropyl peroxy dicarbonate, 2,2'-azobis(2,4-dimethylvaleronitrile), 2-t-butylazo-2-cyanobutane and the like; a mixture of catalysts may also be used. The preferred initiators are 2,2'-azobis(isobutyronitrile), 2,2'-azobis(2,4-dimethylvaleronitrile), 2-t-butylazo-2-cyanobutane and 2,2'-azobis(2 methyl butyronitrile). Generally, from about 0.5 percent to about 10 percent, preferably from about 1 percent to about 4 percent, by weight of initiator based on the weight of the monomer will be employed in the process of the invention.

The polyurethane foams employed in the present invention are generally prepared by the reaction of a graft polyol with an organic polyisocyanate in the presence of a blowing agent and optionally in the presence of additional polyhydroxyl-containing components, chain-extending agents, catalysts, surface-active agents, stabilizers, dyes, fillers and pigments. Suitable processes for the preparation of cellular polyurethane plastics are disclosed in U.S. Pat. Re. 24,514 together with suitable machinery to be used in conjunction therewith. When water is added as the blowing agent, corresponding quantities of excess isocyanate to react with the water and produce carbon dioxide may be used. It is possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water and/or additional polyol to prepare a foam. Alternatively, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane-diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate; the triisocyanates such as 4,4',4''-triphenylmethane triisocyanate, and toluene 2,4,6-triisocyanate; and the tetraisocyanates such as 4,4'-dimethyldiphenylmethane-2,2'-5,5'-tetraisocyanate and polymeric polyisocyanates such as polymethylene polyphenylene polyisocyanate. Especially useful due to their availability and properties are toluene diisocyanate, 4,4'-diphenylmethane-diisocyanate and polymethylene polyphenylene polyisocyanate.

Crude polyisocyanates may also be used in the compositions of the present invention, such as crude toluene diisocyanate obtained by the phosgenation of a mixture of toluene diamines or crude diphenylmethane isocyanate obtained by the phosgenation of crude diphenylmethane diamine. The preferred or crude isocyanates are disclosed in U.S. Pat. No. 3,215,652.

As mentioned above, the graft polyols may be employed along with another polyhydroxyl-containing component commonly employed in the art. Any of the polyhydroxyl-containing components which are described above for use in the preparation of the graft polyols may be employed in the preparation of the polyurethane foams useful in the present invention.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol and primary and secondary diamines which react more readily with the prepolymer than does water such as phenylene diamine, 1,4-cyclohexane-bis-(methylamine), ethylenediamine, diethylenetriamine, N-(2-hydroxypropyl)ethylenediamine, N,N'-di(2-hydroxypropyl)ethylenediamine, piperazine, and 2-methylpiperazine.

Any suitable catalyst may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride, dibutyltin di-2-ethyl hexanoate, stannous oxide, as well as other organo metallic compounds such as are disclosed in U.S. Pat. No. 2,846,408.

A surface-active agent is generally necessary for production of high grade polyurethane foam according to the present invention, since in the absence of same, the foams collapse or contain very large uneven cells. Numerous surface-active agents have been found satisfactory. Nonionic surface-active and wetting agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkanolamine salts of long chain alkyl acid sulfate esters, alkyl sulfonic esters, and alkyl arylsulfonic acids.

The following examples illustrate the nature of the invention. All parts are by weight unless otherwise stated. In the examples, the physical properties of the polyurethane foam were determined by the following ASTM tests:

Density—D1622-63
Tensile Strength—D1623-72
Elongation—D412
Split Tear—D470
Compression Set—D395
Compression Load—D1564
Humid Aging—D1564

The following abbreviations are employed in the examples below:

| | |
|---|---|
| Polyol A | is a glycerine, propylene oxide, ethylene oxide adduct containing 9 percent ethylene oxide having a hydroxyl number of 50 and 0.3 moles of unsaturation per mole of polyol. |
| Polymer Dispersion B | is Polyol A containing 30 percent of a copolymer of 3:1 acrylonitrile:-styrene with a hydroxyl number of 35. |
| Polyol C | is a glycerine, propylene oxide, ethylene oxide adduct containing 6 percent ethylene oxide, having a hydroxyl number of 50 and 0.3 moles of unsaturation per mole of polyol. |
| Polymer Dispersion D | is Polyol C containing 21 percent of a copolymer of 1:1 acrylonitrile:-styrene with a hydroxyl number of 40. |

-continued

| | |
|---|---|
| Polymer Dispersion E | is Polyol C containing a 31 percent copolymer of 3:1 acrylonitrile:-styrene with a hydroxyl number of 35. |
| Polyol F | is a glycerine-propylene glycol, propylene oxide, ethylene oxide adduct containing 14 percent ethylene oxide with a hydroxyl number of 35 and 0.3 mole of unsaturation per mole of polyol. |
| Polymer Dispersion G | is Polyol F containing a 21 percent copolymer of 1:1 acrylonitrile:-styrene with a hydroxyl number of 28. |
| Polymer Dispersion H | is Polyol C containing a 35 percent copolymer of 3:1 acrylonitrile:-styrene with a hydroxyl number of 32.5 |
| Polymer Dispersion I | is Polyol F containing a 26 percent copolymer of 1:1 acrylonitrile:-styrene with a hydroxyl number of 26. |
| Polyol J | is a glycerine, propylene glycol, propylene oxide, ethylene oxide adduct containing 15 percent ethylene oxide having a hydroxyl number of 33 and 0.3 mole of unsaturation per mole of polyol. |
| Polymer Dispersion K | is Polyol J containing 20 percent of a copolymer of 2:3 acrylonitrile:-styrene with a hydroxyl number of 27. |
| Polymer Dispersion L | is Polyol F containing 21 percent of a copolymer of 2:3 acrylonitrile:-styrene with a hydroxyl number of 28. |
| Initiator A | is 2,2'-azobis(isobutyronitrile). |
| Initiator B | is 2-t-butylazo-2-cyanobutane. |
| Polymer Dispersion M | is Polyol F containing 21 percent of a copolymer of 1:1 acrylonitrile:-styrene with a hydroxyl number of 28. |
| RUBINATE M | is a crude diphenylmethane diisocyanate having functionality of about 2.7 sold by Rubicon Chemicals, Inc. |
| Polyol N | is a glycerine, propylene oxide, ethylene oxide adduct containing 16 percent ethylene oxide having a hydroxyl number of 35. |
| THONCAT DM-70 | is an amine catalyst sold by Jefferson Chemical Corporation. |
| Surfactant DC-5043 | is a silicone surfactant sold by Dow Chemical Corporation. |
| FOMREZ UL-1 | is an organotin catalyst sold by Witco Chemical Corporation. |
| TDI | is a toluene diisocyanate, 80/20 2,4/2,6. |

EXAMPLE 1

A one-liter, four-necked flask fitted with a stirrer, thermowell, water-cooled condenser, nitrogen inlet, and addition tube was charged with 350 parts of Polyol A. After heating the polyol to 115° C. under a nitrogen flow, addition of a monomer stream composed of 225 parts of acrylonitrile and 75 parts of styrene and a polyol-initiator stream compound of 350 parts of Polyol A and 6 parts of Initiator A was begun. The monomer addition time was 180 minutes; the polyol-initiator addition time was 190 minutes. The condenser was set up so that any condensed monomer was not returned to the reaction flask. When the addition was completed, the reaction mixture was allowed to react for an additional 30 minutes at 115° C. The reaction was then stripped at less than 1 millimeter Hg pressure and 115° C. for 30 minutes. The product, Polymer Dispersion B, had a Brookfield viscosity of 2790 cps at 25° C. and percent polymer retained $\times 10^3$ of 3.68.

EXAMPLE 2-9

A series of graft polymer dispersions as shown in Examples 2-9 were prepared employing the procedure and apparatus of Example 1 and the indicated concentrations and types of polyol, monomers and initiators as shown in Table 1 below. The resulting Brookfield viscosities and percent polymer retained $\times 10^3$ are as indicated.

TABLE 1

| Example | Polymer Dispersion | Polyol/Parts | Acrylonitrile Parts | Styrene Parts | Initiator/Parts | Brookfield Viscosity cps @ 25° C. | % Polymer Retained $\times 10^3$ |
|---|---|---|---|---|---|---|---|
| 2 | E | C/690 | 225 | 75 | B/6.0 | 2700 | 1.83 |
| 3 | G | F/790 | 105 | 105 | A/4.2 | 2550 | 0.058 |
| 4 | H | A/640 | 270 | 90 | B/7.2 | 4920 | 15.4 |
| 5 | I | F/740 | 130 | 130 | B/2.6 | 3250 | 21.4 |
| 6 | K | J/800 | 80 | 120 | A/4.0 | 2160 | 5.82 |
| 7 | L | F/790 | 84 | 126 | A/4.2 | 2850 | 4.79 |
| 8 | M | F/785 | 112.5 | 112.5 | B/2.25 | 2100 | ND |
| 9 | D | C/790 | 105 | 105 | B/4.0 | 1700 | 4.69 |

EXAMPLES 10-14

The polyols designated below in Table II were prepared employing identical concentrations and reaction conditions except that one set was prepared under normal reflux conditions and the other set was prepared without reflux.

TABLE II

| | | Reflux | No Reflux |
|---|---|---|---|
| Example | Polyol | % Polymer Retained $\times 10^3$ | % Polymer Retained $\times 10^3$ |
| 10 | K | 20.5 | 5.82 |
| 11 | G | 41.5 | 4.75 |
| 12 | L | 17.5 | 4.79 |
| 13 | D | 150 | 4.52 |
| 14 | E | 172 | 4.55 |

EXAMPLES 15 and 16

Hand mix foams were prepared employing the formulations indicated in Table III.

TABLE III

| | 15 | 16 |
|---|---|---|
| Formulations, pbw | | |
| POLYOL N | 80 | 80 |
| Polyol M | 20 | 20 |
| Water | 2.6 | 2.6 |
| Triethylenediamine | 0.1 | 0.1 |
| bis(2-methylaminoethyl) ether | 0.12 | 0.12 |
| THANCAT DM-70 | 0.3 | 0.3 |
| Surfactant DC-5043 | 1.5 | 1.5 |
| FOMREZ UL-1 | 0.03 | 0.03 |
| TDI/RUBINATE M | 100/32.4 | 100/32.4 |
| Physical Properties | | |
| Density, pcf | 3.96 | 3.76 |
| Tensile, psi | 22.9 | 21.8 |

TABLE III-continued

|  | 15 | 16 |
|---|---|---|
| Elongation, % | 103 | 123 |
| Tear, pi | 2.2 | 2.0 |
| Sag Factor | 2.88 | 2.56 |
| Recovery, % | 86.3 | 85.2 |
| 50% CLD, psi | 1.48 | 1.37 |
| 50% Compression set, % | 16.6 | 19.4 |
| Humid aged 5 hours at 250° F. | | |
| 50% compression set, % | 11.0 | 9.7 |

The embodiments of the invention in which an exclusive property or privilege is claimed are defined as follows:

1. In the process for the preparation of a graft polyol dispersion bythe in situ free radical polymerization of an ethylenically unsaturated monomer or monomers, selected from the group consisting of acrylonitrile, styrene and mixtures thereof, in the presence of a free radical initiator, in a polyol, the improvement comprising conducting said polymerization under such conditions that none of the evaporated monomer or monomers is returned to the dispersion wherein said polymerization is conducted at temperatures between 80° C. and 180° C.

2. The process of claim 1 wherein the amount of said unsaturated monomer is from 1 percent to 60 percent based on the total weight of the product.

3. In the process for the preparation of a graft polymer dispersion in a polyol by the in situ free radical polymerization of an ethylenically unsaturated monomer or monomers selected from the group consisting of acrylonitrile, styrene and mixtures thereof, in a polyol, the improvement comprising conducting said polymerization without reflux of said monomer or monomers at temperatures between 80° C. and 180° C.

4. The process of claim 3 wherein the amount of said unsaturated monomer is from 1 percent to 60 percent based on the total weight of the product.

5. The process of claim 3 wherein said polymerization is conducted under pressure of an inert gas.

6. The product produced by the process of claim 1.

7. The product produced by the process of claim 3.

* * * * *